United States Patent
Shoji

(10) Patent No.: US 11,126,884 B2
(45) Date of Patent: Sep. 21, 2021

(54) IMAGE PROCESSING APPARATUS, METHOD FOR CONTROLLING IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Ryota Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 16/166,541

(22) Filed: Oct. 22, 2018

(65) Prior Publication Data
US 2019/0130205 A1   May 2, 2019

(30) Foreign Application Priority Data
Nov. 1, 2017   (JP) .............................. JP2017-211938

(51) Int. Cl.
*G06K 9/36*   (2006.01)
*G06T 7/20*   (2017.01)
(Continued)

(52) U.S. Cl.
CPC .............. *G06K 9/36* (2013.01); *G06F 3/0482* (2013.01); *G06F 3/04847* (2013.01);
(Continued)

(58) Field of Classification Search
CPC ..... G06K 9/36; G06F 3/0482; G06F 3/04847; G06T 5/007; G06T 7/20; G06T 11/60;
(Continued)

(56) References Cited

U.S. PATENT DOCUMENTS

| | | | |
|---|---|---|---|
| 2007/0198931 A1* | 8/2007 | Ono ............... | H04N 21/440263 715/719 |
| 2013/0021505 A1* | 1/2013 | Plowman ............... | H04N 5/357 348/241 |
| 2016/0119576 A1 | 4/2016 | Takeda | |

FOREIGN PATENT DOCUMENTS

| | | |
|---|---|---|
| CN | 101150657 A | 3/2008 |
| JP | 2012-244313 A | 12/2012 |

(Continued)

OTHER PUBLICATIONS

JP2013183305A Shoji, machine translated (Year: 2013).*
(Continued)

*Primary Examiner* — Jianxun Yang
(74) *Attorney, Agent, or Firm* — Cowan, Liebowitz & Latman, P.C.

(57) ABSTRACT

An image processing apparatus comprising a first processing unit which executes first processing including first development processing on frames of RAW moving images, a second processing unit which executes second processing including second development processing on frames of RAW moving images, and a control unit which performs control to generate, from RAW moving images to be processed, first and second moving images by causing the first and second processing units to execute the first and second processing, respectively, wherein the control unit switches between execution of the first and second processing on each frame of the RAW moving images to be processed and execution of the first processing on a plurality of the frames of the RAW moving images to be processed after executing the second processing on the plurality of the frames of the RAW moving images to be processed.

10 Claims, 8 Drawing Sheets

(51) Int. Cl.
*G06F 3/0482* (2013.01)
*G06F 3/0484* (2013.01)
*G06T 11/60* (2006.01)
*G06T 5/00* (2006.01)

(52) U.S. Cl.
CPC ............... *G06T 5/007* (2013.01); *G06T 7/20* (2013.01); *G06T 11/60* (2013.01); *G06T 2207/10016* (2013.01)

(58) Field of Classification Search
CPC ......... G06T 2207/10016; G06T 1/0007; G06T 5/50; H04N 5/91; H04N 5/92; H04N 5/357; H04N 13/161; H04N 5/23232
See application file for complete search history.

(56) References Cited

FOREIGN PATENT DOCUMENTS

| | | |
|---|---|---|
| JP | 2013-183305 A | 9/2013 |
| JP | 2015-195571 A1 | 11/2015 |
| WO | 2016/092647 A1 | 6/2016 |

OTHER PUBLICATIONS

The above documents were cited in a Aug. 3, 2020 Chinese Office Action, with an English Translation, that issued in Chinese Patent Application No. 201811296579.5.

The above foreign patent document was cited in the Jul. 9, 2021 Japanese Office Action, which is enclosed without an English Translation, that issued in Japanese Patent Application No. 2017-211938.

\* cited by examiner

F I G. 1A
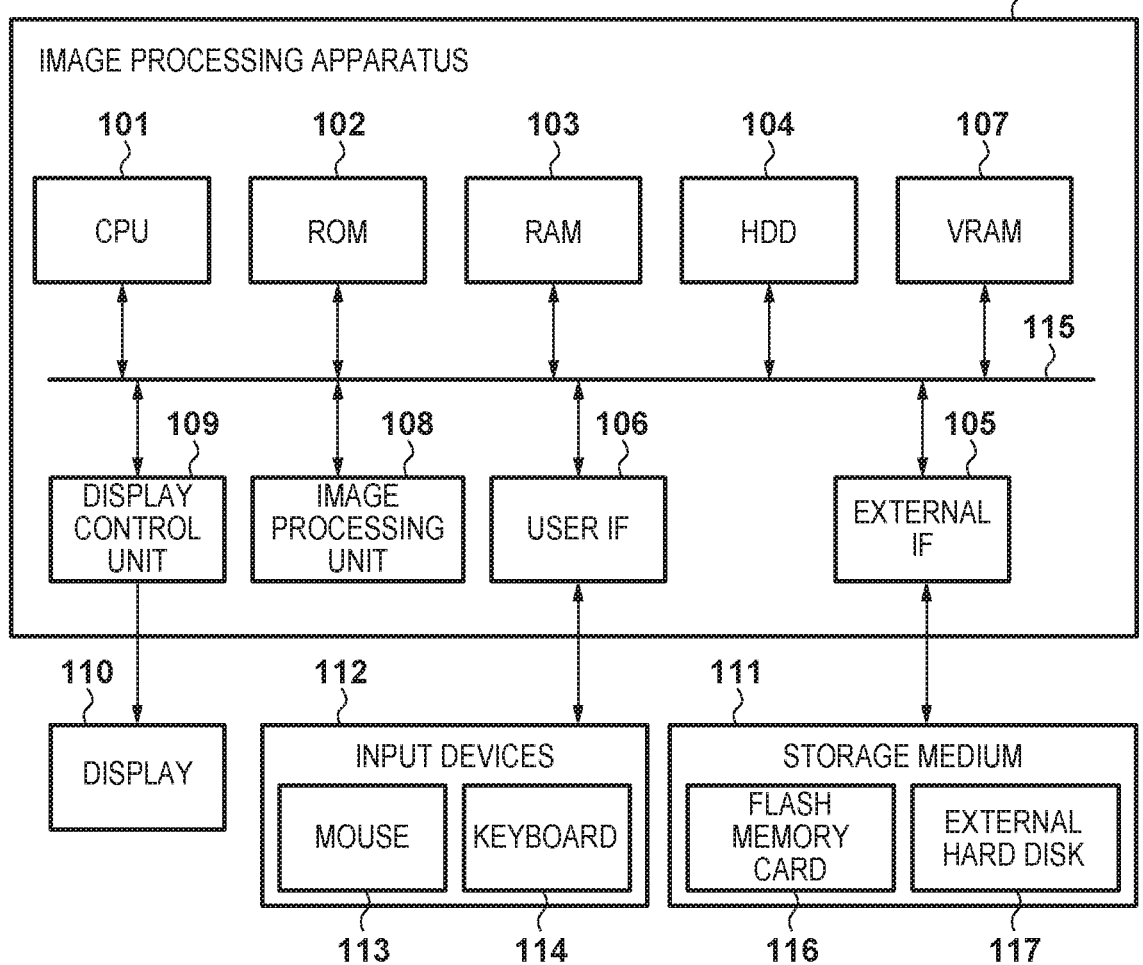
F I G. 1B
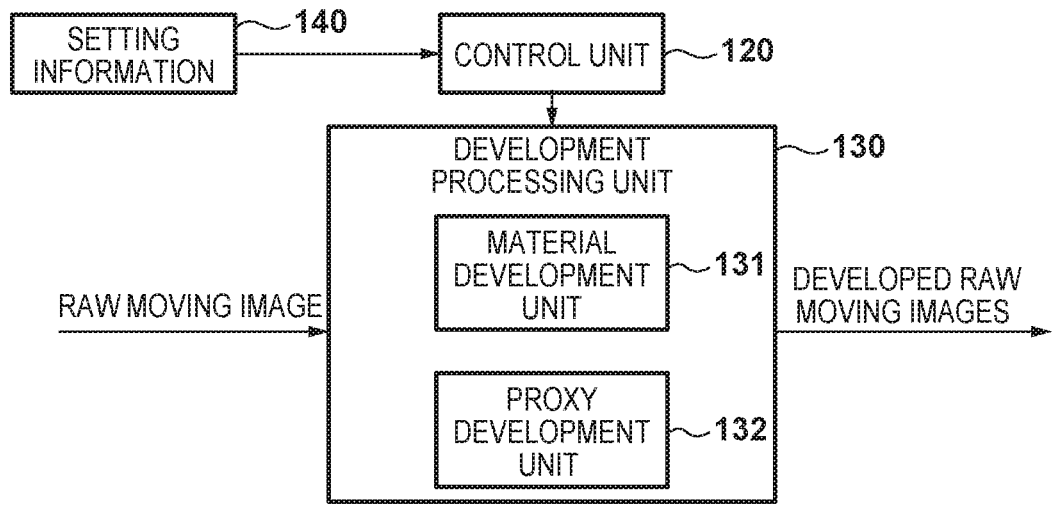

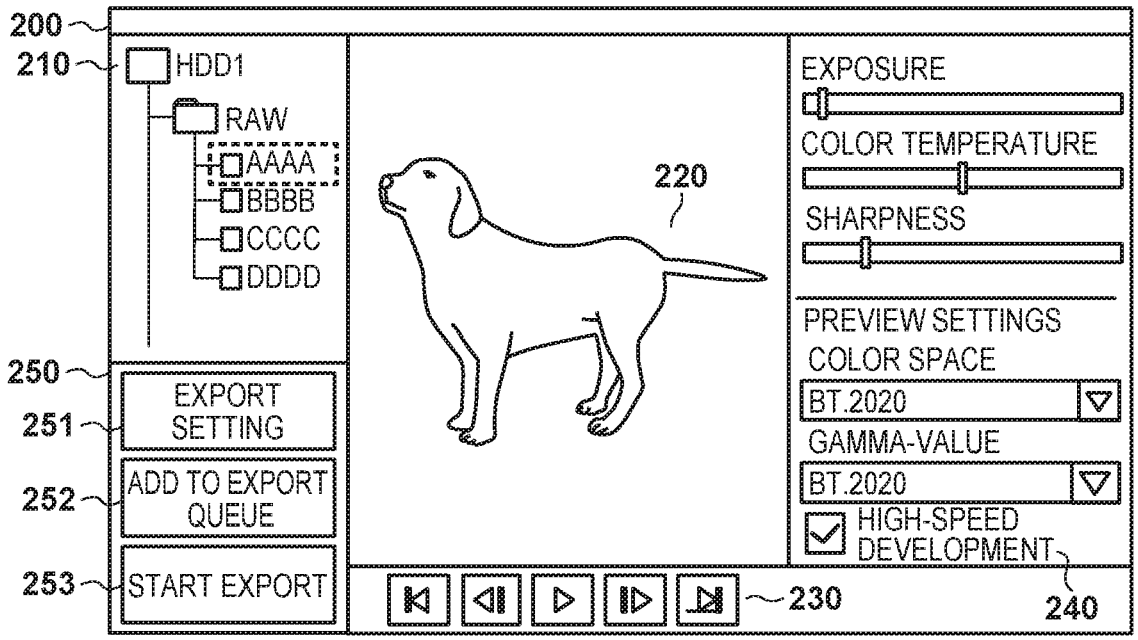

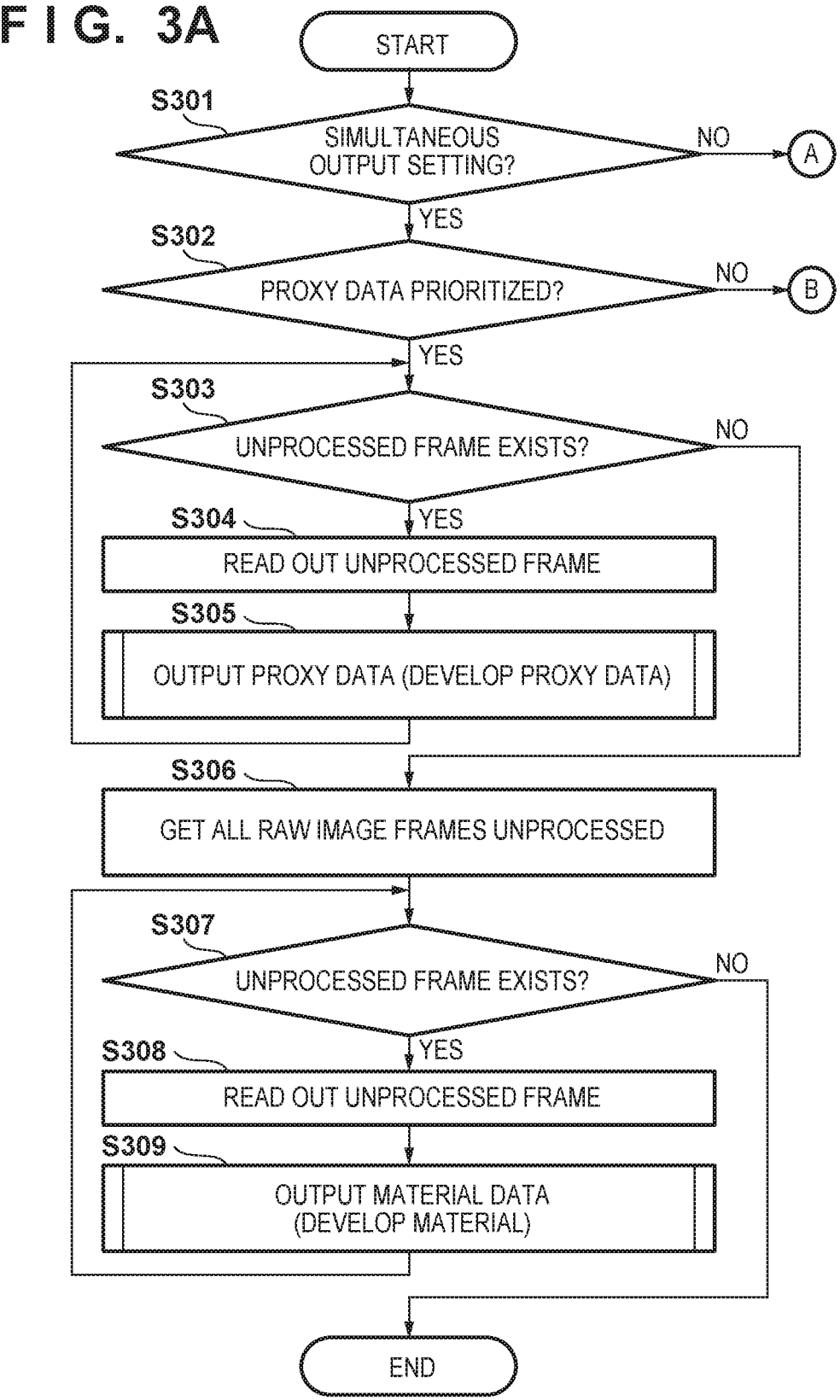

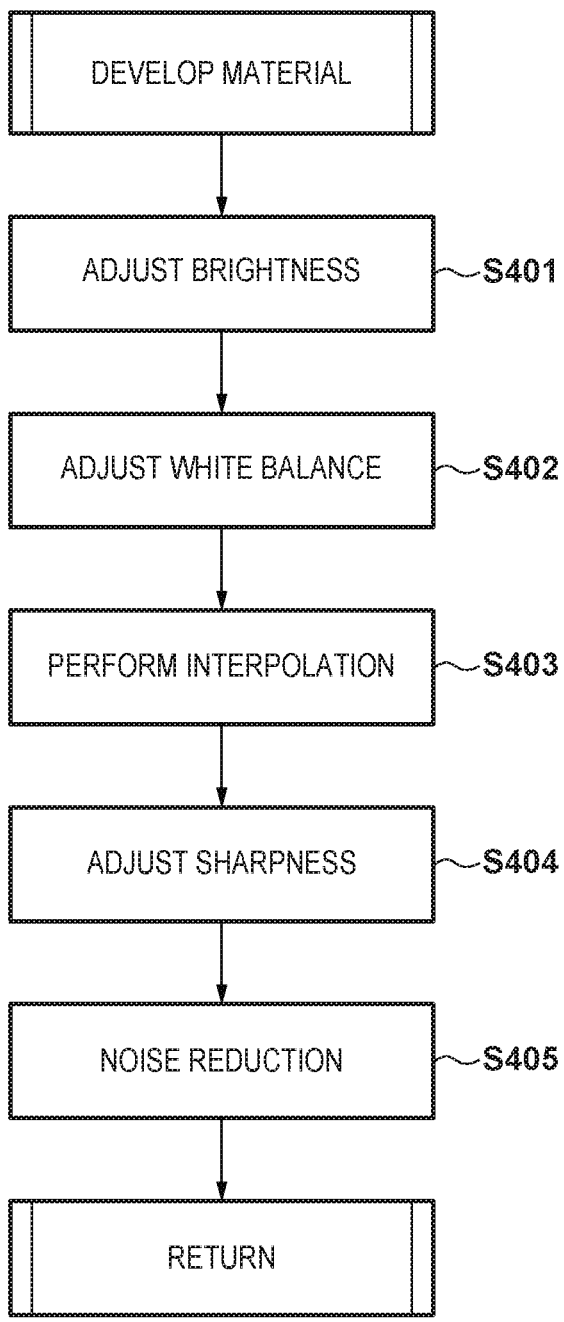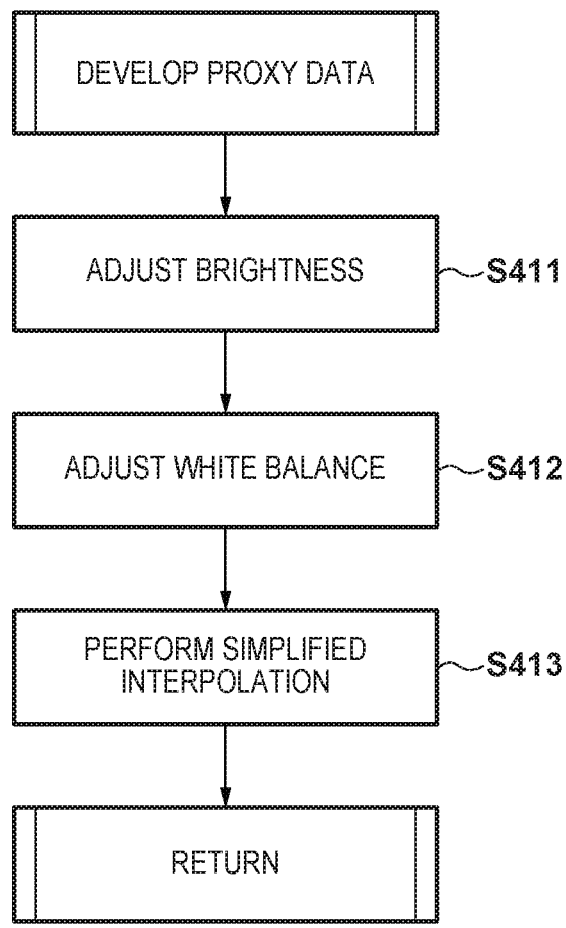

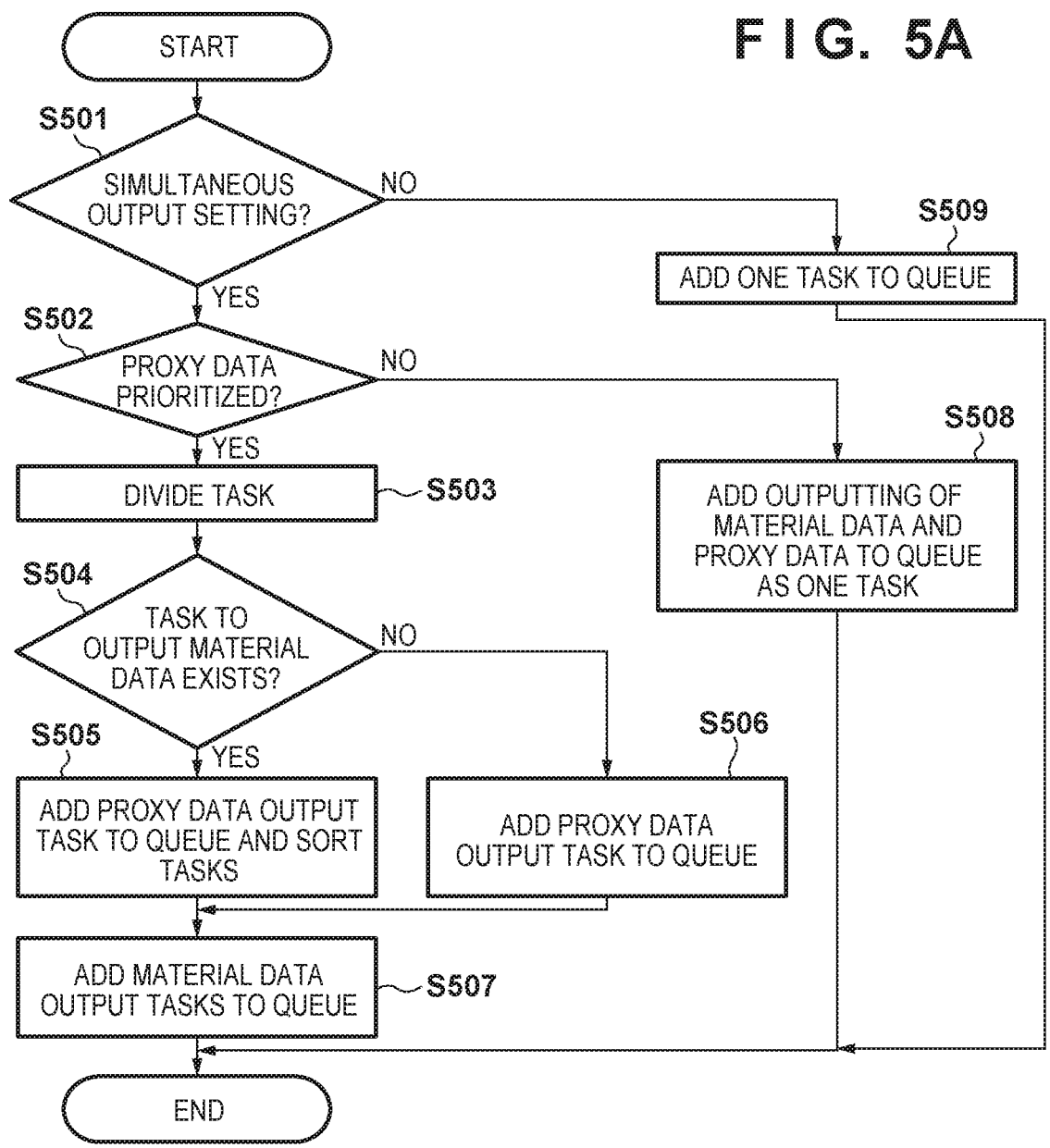

IMAGE PROCESSING APPARATUS, METHOD FOR CONTROLLING IMAGE PROCESSING APPARATUS, AND NON-TRANSITORY COMPUTER-READABLE STORAGE MEDIUM

BACKGROUND OF THE INVENTION

Field of the Invention

The invention relates to an image processing apparatus, a method for controlling the image processing apparatus, and a non-transitory computer-readable storage medium.

Description of the Related Art

In recent years, in the field of video production, digital video cameras capable of shooting RAW format moving images (referred to as "RAW moving images" hereinafter) have gained attention. RAW moving images record information that is acquired by the image sensor of a camera in each frame as is, such that the image quality can be freely adjusted later by developing the RAW moving images on a personal computer (PC). Developed RAW moving images are converted to a commonly used file format, such as Digital Picture Exchange (DPX). Converting RAW moving images to a commonly used file format and saving these images as a file will be referred to as "exporting" hereinafter.

When working with RAW moving images in a color grading system, it is common practice to convert RAW moving images to a format that assigns top priority to the image quality (for example, RGB uncompressed format). Development of RAW moving images with image quality thereof given top priority will be referred to as "material development" hereinafter. Additionally, moving image data on which material development has been performed will be referred to as "material data" hereinafter.

On the other hand, when working with RAW moving images in an editing system, high quality moving images are often unnecessary in cut editing and other tasks. Accordingly, it is common practice to use reduction, compression, and other techniques to generate separate moving images into relatively small sized pieces of data on which editing is performed. Development of RAW moving images with image quality thereof not given priority will be referred to as "proxy development" hereinafter. Additionally, moving image data on which proxy development has been performed will be referred to as "proxy data" hereinafter.

Editing using proxy data determines the final segment of moving images to be used, allowing the editing system to output an Edit Decision List (hereinafter "EDL") in which time code information of that segment is described. Subsequently, the EDL and the material data are loaded to the color grading system in which final color adjustment and other processing is performed on the segment specified in the EDL.

In this way, in a workflow in which editing and color grading are performed on RAW moving images, two different types of data, material data and proxy data, are generated from the RAW moving images. A large amount of processing needs to be performed to develop RAW moving images. To address this, the technology disclosed in Japanese Patent Laid-Open No. 2013-183305 reduces the processing time when generating material data and proxy data at the same time by using previously generated material data to generate proxy data.

In the foregoing workflow, proxy data is needed earlier than material data. However, as material data is used to generate proxy data in the method described in Japanese Patent Laid-Open No. 2013-183305, the order in which proxy data is exported cannot be changed.

SUMMARY OF THE INVENTION

The invention provides a technology to prioritize the export of proxy data when exporting material data and proxy data at the same time.

One aspect of embodiments of the invention relates to an image processing apparatus comprising, a first processing unit configured to execute first processing on frames of RAW moving images, the first processing including first development processing, a second processing unit configured to execute second processing on frames of RAW moving images, the second processing including second development processing and a control unit configured to perform control to generate, from RAW moving images to be processed, first and second moving images by causing the first and second processing units to execute the first and second processing, respectively, wherein the control unit switches between execution of the first and second processing on each frame of the RAW moving images to be processed and execution of the first processing on a plurality of the frames of the RAW moving images to be processed after executing the second processing on the plurality of the frames of the RAW moving images to be processed.

Further features of the invention will become apparent from the following description of exemplary embodiments (with reference to the attached drawings).

BRIEF DESCRIPTION OF THE DRAWINGS

FIG. 1A is a block diagram that shows one example of the configuration of an image processing apparatus 100 according to an embodiment of the invention.

FIG. 1B is a functional block diagram elated to the export of RAW moving images according to the embodiment of FIG. 1A.

FIG. 2A is a view showing an example of a display screen for receiving setting inputs from a user according to the embodiment of FIG. 1A.

FIG. 2B is a view showing an example of an export queue window according to the embodiment of FIG. 1A.

FIG. 2C is a view showing an example of an export setting dialog according to the embodiment of FIG. 1A.

FIG. 3A and FIG. 3B are flowcharts that show an example of the export processing performed by the image processing apparatus 100 according to the embodiment of FIG. 1A.

FIG. 4A is a flowchart that shows an example of the development of material according to the embodiment of FIG. 1A.

FIG. 4B is a flowchart that shows an example of the proxy development according to the embodiment of FIG. 1A.

FIG. 5A is a flowchart that shows an example of the processing of an export queue performed by the image processing apparatus 100 according to a second embodiment of the invention.

FIG. 5B is a view showing an example of an export queue window according to the second embodiment.

DESCRIPTION OF THE EMBODIMENTS

Figure 3B:
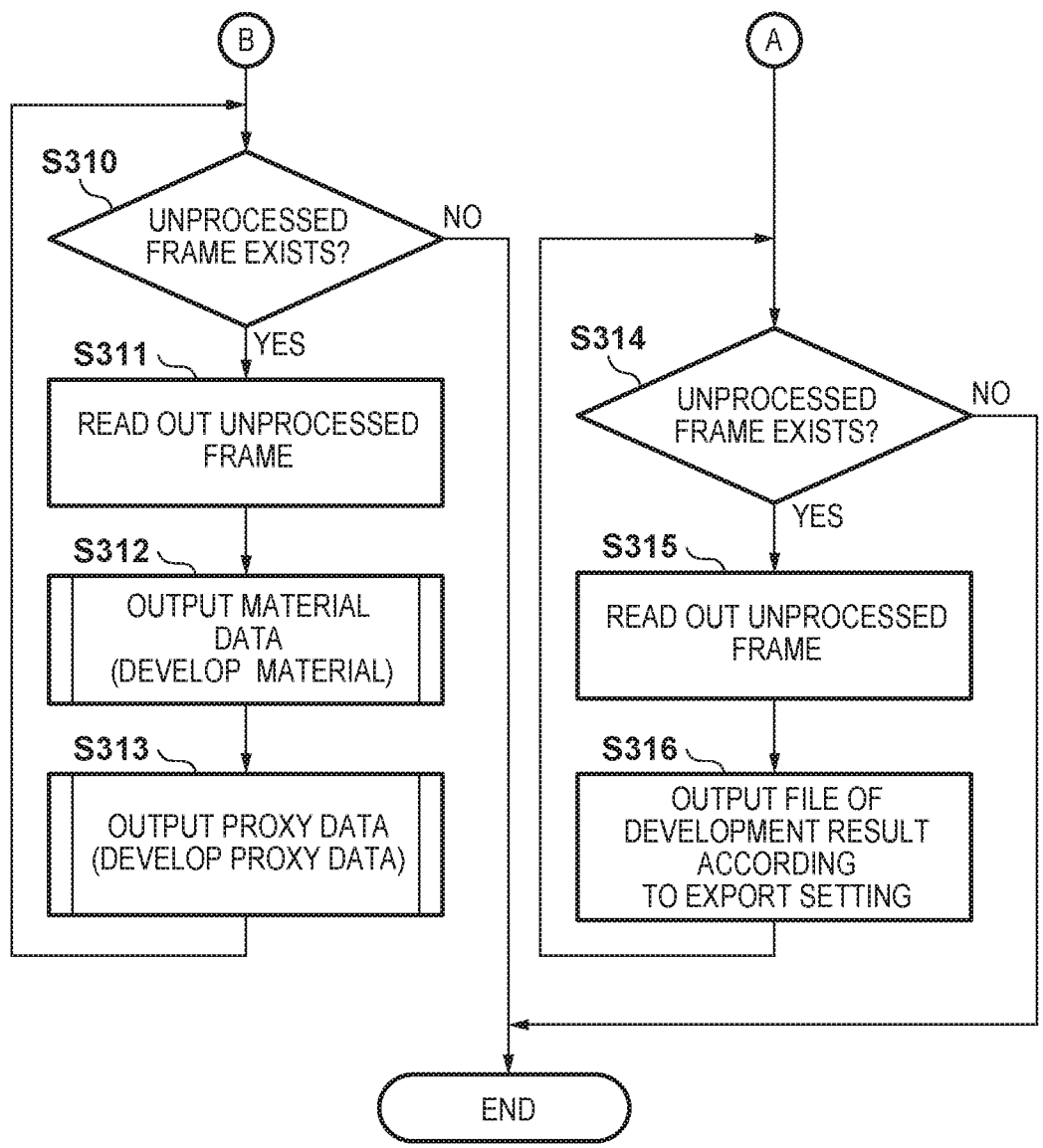

Embodiments of the invention will be described in detail hereinafter reference to the attached drawings.

Embodiment 1

The following describes an image processing apparatus that exports RAW moving images according to a first embodiment of the invention. FIG. 1A is a block diagram that shows one example of the configuration of an image processing apparatus 100 according to this embodiment of the invention. The image processing apparatus 100 is configured to include the components described below.

First, a CPU 101 executes predetermined programs stored in a ROM 102 and a HDD 104 to control the operations of the image processing apparatus 100. The ROM 102 stores control programs that describe the control procedures performed by the CPU 101. A RAM 103 serves as a work memory for temporarily storing the control programs and data. The HDD (Hard Disk Drive) 104 is a storage unit for storing predetermined programs, such as applications and an OS, as well as data. Additionally, the HDD 104 stores RAW moving images.

An external IF 105 is an interface that enables connection between an external member and the external storage medium 111, such as a flash memory card 116 and an external hard disk 117. A user IF 106 processes inputs made by the user on input devices 112, such as a mouse 113 and a keyboard 114. A VRAM 107 stores images that are displayed by the image processing apparatus 100. An image processing unit 108 performs predetermined image processing, including compression and encoding, on the RAW moving images stored by the HDD 104. The image processing unit 108 may be configured as a piece of hardware such as a logic circuit dedicated to image processing (ASIC). Alternatively, the image processing unit 108 may be configured as a piece of software implemented by a predetermined processor that executes processing programs stored in the memory. A display control unit 109 controls a display 110 to display the images stored in the VRAM 107. The display 110 is a display unit, such as a liquid crystal display. These components are connected to an internal bus 115, which serves as the transmission path for the components and control signals.

Next, FIG. 1B is a functional block diagram related to the export of RAW moving images according to this embodiment of the invention. In this embodiment, a control unit 120 controls a development processing unit 130 to perform material development and proxy development on the frames included in the RAW moving images to be processed. The control unit 120 controls the development processing by providing development parameters included in setting information 140 to a material development unit 131, which performs material development, and a proxy development unit 132, which performs proxy development. Additionally, the setting information 140 includes flag information indicating whether or not proxy data is prioritized, and the control unit 120 switches the priority between material development and proxy development based on the flag information. If the flag information indicates that priority is to be given to the generation of proxy data, material development is performed after proxy development has been performed on all of the frames of the RAW moving images to be processed. The developed data is stored in a specified folder. Moreover, the control unit 120 controls the export queue for controlling the execution sequence of the development processing.

The functionality of the control unit 120 and the development processing unit 130 may be implemented, for example, by the CPU 101 executing programs stored in the ROM 102 and the HDD 104. Alternatively, the image processing unit 108 may function as the control unit 120 and the development processing unit 130. Furthermore, the above may also be realized by the image processing unit 108 and the CPU 101 working in cooperation, with the CPU 101 functioning as the control unit 120 and the image processing unit 108 functioning as the development processing unit 130.

The following provides an overview of an application for accepting an operation made by the user of the image processing apparatus 100, with reference to FIGS. 2A to 2C.

FIG. 2A is an example of a display screen for accepting settings input by the user according to the embodiment of the invention. In FIG. 2A, a screen 200 includes a moving image list display area 210, a preview area 220, a playback control section 230, a development parameter setting section 240, and a button display area 250.

The moving image list display area 210 displays a list of the RAW moving images that have been loaded to the image processing apparatus 100. FIG. 2A shows that four different RAW moving images ("AAAA", "BBBB", "CCCC", and "DDDD" are the titles of the moving images) have been loaded. The preview area 220 is where a moving image selected by the user is played back for view. In this case, the moving image titled "AAAA" is selected and played back. The playback control section 230 displays a group of buttons for controlling the playback of the moving image displayed in the preview area 220. These buttons include those for playback/pause, fast-forward, rewind, skip, etc.

The development parameter setting section 240 displays various setting areas for setting and inputting development parameters for RAW moving images. The button display area 250 displays a group of buttons for performing various operations related to export. An export setting button 251 is operated to display dialog boxes (see FIG. 2C) for export development settings when the user wishes to set development settings. An export queue addition button 252 is operated to add the currently selected RAW moving image to the export queue. When the export queue addition button 252 is operated, a processing instruction (i.e., a task) to export the currently selected RAW moving image with the current development settings is registered. An export start button 253 is operated to start the export of RAW moving images added to the export queue.

Next, FIG. 2B is a view showing an example of an export queue window 260 that displays information about the RAW moving images added to the export queue and the progress of export according to this embodiment of the invention. The export queue window 260 may be superimposed on the screen 200, for example, when the export queue addition button 252 is operated or when a predetermined operation to activate the window is performed.

In the example shown in FIG. 2B, the RAW moving images "AAAA", "BBBB", and "CCCC" have been added to the export queue. In FIG. 2B, the export queue window 260 includes a list screen 261 and an export progress indication section 262. The list screen 261 shows a list 263 of the RAW moving images added to the export queue. Also displayed are the progress of export 264 and the specific settings of the export 265 to 267 of the RAW moving images. The list screen 261 shows one task per line and, in the illustrated example, three tasks to simultaneously output material data and proxy data are in the export queue. The export progress indication section 262 shows the overall progress of the export.

Next, FIG. 2C is a view showing an example of the export setting dialog according to the embodiment of the invention. An export setting dialog box 280 may be displayed, for example, when the export setting button 251 is operated. In FIG. 2C, the dialog box 280 includes a save destination folder setting section 281, an export file setting section 282, a material data output format setting section 283, a proxy data output format setting section 284, and a proxy data priority output setting section 285.

The save destination folder setting section 281 is used to create a folder in which exported files are saved. The export file setting section 282 is used to set the type(s) of files to be exported. The material data output format setting section 283 is used to set the type of output format of the material data. The proxy data output format setting section 284 is used to set the type of output format of the proxy data. The proxy data priority output setting section 285 is used to set whether or not the outputting of proxy data is prioritized.

The various types of information set as above are held in the RAM 103 as the setting information 140 and are referred to by the control unit 120 when executing tasks registered in the export queue.

The following describes an example of the processing performed by the image processing apparatus 100 according to this embodiment of the invention. FIG. 3A and FIG. 3B are flowcharts that show one example of the processing performed by the image processing apparatus 100 according to this embodiment of the invention. In particular, the following describes a case in which the export queue addition button 252 on the screen 200 shown in FIG. 2A is operated to add a RAW moving image to the export queue, and the export start button 253 is operated to export data. The following also describes a case in which processing that corresponds to the foregoing flowchart is performed, for example, by the CPU 101 executing programs stored in the ROM 102 and the HDD 104 to function as the control unit 120 and the development processing unit 130.

Initially, in step S301, the CPU 101 determines whether or not simultaneous output has been set for the material data and proxy data from the RAW moving images that have been added to the export queue. In this case, the setting information 140 is referred to in order to determine whether or not the check boxes for material data and proxy data are both checked in the export file setting field 282 of the export setting dialog box 280 shown in FIG. 2C. If it is determined that simultaneous outputting has been set, the CPU 101 advances the process to step S302, Conversely, if it is determined that simultaneous outputting has not been set, the CPU 101 advances the process to step S314.

In the subsequent step S302, the CPU 101 determines whether or not outputting of proxy data is prioritized. In this case, the setting information 140 is referred to determine whether or not the check box of the data priority output setting section 285 shown in FIG. 2C is checked. If it is determined that outputting of proxy data is prioritized, the CPU 101 advances the process to step S303. Conversely, if it is determined that outputting of proxy data is not prioritized, the CPU 101 advances the process to step S310.

Next, in step S303, the CPU 101 determines whether or not, in the RAW moving images to be exported, there are any RAW frames to which export processing has not been applied. For example, the RAM 103 may be provided with an area in which a flag indicating whether or not a RAW frame has been processed is saved for each RAW frame, and a process-completed flag may set for each RAW frame subjected to export processing. The CPU 101 refers to these flags and advances the process to step S304 if there are any unprocessed frames. Conversely, if there are no unprocessed frames, the CPU 101 advances the process to step S306.

Subsequently, in step S304, the CPU 101 reads out, from the storage medium 111, one unexported frame of the RAW moving images to be exported. If the RAW frame that has been read out is compressed, the image processing unit 108 also expands the compressed frame. In step S305, the CPU 101 applies proxy development to the RAW frame read out in step S304 and refers to the setting information 140 to save the generated proxy data in the folder set in the save destination folder setting section 281. Proxy development will be described in detail below with reference to FIG. 4B. Then, the CPU 101 sets a process-completed flag for the exported RAW frame in the RAM 103. Steps S304 and S305 are repeated until these steps have been performed on all of the RAW frames of the RAW moving images to be exported. Once all of the RAW frames have been processed, it is determined in step S303 that no unprocessed frames exist, and thus steps S303 to S305 for outputting proxy data are complete. The generation of proxy data from the RAW moving images to be exported is completed when the processing in steps S304 and S305 has been performed on all of the RAW frames of the RAW moving images to be exported.

In step S306, the CPU 101 sets a process-uncompleted flag for all of the RAW frames to be exported, in the RAM 103. In step S306, in order to inform the user that the proxy data of all of the RAW frames has been output, the display of the "proxy data" section may be changed in the list screen 261 of FIG. 2B, which displays the content of the export. For example, an icon indicating that all of the frames have been output may be shown, or the color of the characters in the "proxy data" section or the background color of the section may be changed.

Next, in step S307, the CPU 101 determines whether or not, in the RAW moving images to be exported, there are any RAW frames to which export processing has not been applied. For example, the RAM 103 may be provided with an area in which a flag is set indicating whether or not processing has been completed on a RAW frame basis, and a process-completed flag may be set for RAW frames that have been exported. The CPU 101 refers to these flags and advances the process to step S308 if there are any unprocessed frames. Conversely, if there are no unprocessed frames, the CPU 101 terminates the processing. Subsequently, in step S308, the CPU 101 again reads out, from the storage medium 111, one unexported frame of the RAW moving images to be exported. If the RAW frame that has been read out is compressed, the image processing unit 108 also expands the compressed frame. Subsequently, in step S309, the CPU 101 applies material development to the RAW frame read out in step S308 and refers to the setting information 140 to save the generated material data in the folder set in the save destination folder setting section 281. Material development will be described in detail below with reference to FIG. 4A. Then, the CPU 101 sets a process-completed flag for the exported RAW frames in the RAM 103. Steps S308 and S309 are repeated until these steps have been performed on all of the RAW frames of the RAW moving images to be exported. Once all of the RAW frames have been processed, it is determined in step S307 that no unprocessed frames exist, and thus the steps S307 to S309 for outputting material data are complete. The generation of material data from the RAW moving images to be exported is completed when the processing in steps S308 and S309 has been executed on all of the RAW frames of the RAW moving images to be exported.

Next, if it is determined in step S302 that the outputting of proxy data has not been prioritized, the CPU 101 executes, in step S310, the same processing as that of step S303. Subsequently, in step S311, as in step S304, the CPU 101 reads out, from the storage medium 111, one unexported frame of the RAW moving images to be exported. If the RAW frame that has been read out is compressed, the image processing unit 108 also expands the compressed frame. Subsequently, in step S312, the CPU 101 applies material development to the RAW frame read out in step S311 and refers to the setting information 140 to save the generated material data in the folder set in the save destination folder setting section 281. In step S313, the CPU 101 applies proxy development to the RAW frame read out in step S311 and saves the generated proxy data in the folder set in the save destination folder setting section 281 by referring to the setting information 140. Then, the CPU 101 sets a process-completed flag for the exported RAW frames in the RAM 103. Steps S311 to S313 are repeated until these steps have been performed on all of the RAW frames of the RAW moving images to be exported. Once all of the RAW frames have been processed, it is determined in step S310 that no unprocessed frames exist, and thus the steps S310 to S313 for outputting material data and proxy data are complete. The generation of material data and proxy data from the RAW moving images to be exported is completed when the processing in steps S311 to S313 has been performed on all of the RAW frames of the RAW moving images to be exported.

Next, if it is determined in step S301 that simultaneous outputting of material data and proxy data has not been set, the CPU 101 executes, in step S314, the same processing as that of step S303. Thereafter, in step S315, the CPU 101 executes the same processing as in step S304. Subsequently, in step S316, the CPU 101 refers to the setting information 140 and applies material development or proxy development to the RAW frame read out in step S315 according to the setting in the export file setting section 282. Then, the setting information 140 is referred to and the generated data is saved in the folder set in the save destination folder setting section 281. Then, the CPU 101 sets a process-completed flag for the exported RAW frame in the RAM 103.

In this way, as proxy data, which requires relatively less processing, is output first when the output of proxy data is prioritized, it is possible to quickly acquire the proxy data of all of the RAW moving images to be exported. However, since the RAW frames are read out (S304 and S308) in the proxy development (S305) and the development of material (S309), the overall processing requires a longer amount of time.

On the other hand, if the outputting of proxy data has not been set as being prioritized, the outputting of the proxy data and that of the material data of all of the RAW moving images to be exported are completed substantially simultaneously. Accordingly, completion of the outputting of proxy data is delayed. However, as the frame read-out processing (S311) is common to the proxy development (step S313) and the material development (step S312), one frame is subjected to only one instance of frame read-out processing, and thus the overall processing time is shortened.

The following describes, in detail, the development of material performed while material data is output, with reference to FIG. 4A. FIG. 4A is a flowchart that shows an example of the development of material according to this embodiment of the invention. As shown in FIG. 4A, in step S401, the material development unit 131 acquires, from the control unit 120, the exposure value set by the user in the development parameter setting section 240 and multiplies the RAW frame being processed by a coefficient corresponding to the parameter value. Next, in step S402, the material development unit 131 acquires, from the control unit 120, the color temperature value set by the user in the development parameter setting section 240 and multiplies the RAW frame being processed by a coefficient corresponding to the parameter value. Subsequently, in step S403, the material development unit 131 applies an interpolation filter to the RAW frame being processed so as to obtain an RGB image. Then, in step S404, the material development unit 131 acquires, from the control unit 120, the sharpness value set by the user in the development parameter setting section 240 and performs edge enhancement on the RGB image acquired in step S403 based on the parameter value. Next, in step S405, the material development unit 131 performs noise reduction on the foregoing RGB image and outputs the developed image thus obtained.

The following describes, in detail, proxy development performed while proxy data is output, with reference to FIG. 4B. Proxy development is a simplified development process with a smaller process load than material development. FIG. 4B is a flowchart that shows an example of proxy development according to this embodiment of the invention. As shown in FIG. 4B, in step S411, the proxy development unit 132 acquires, from the control unit 120, the exposure value set by the user in the development parameter setting section 240, and multiplies the RAW frame being processed by a coefficient corresponding to the parameter value. Next, in step S412, the proxy development unit 132 acquires, from the control unit 120, the color temperature value set by the user in the development parameter setting section 240, and multiplies the RAW frame being processed by a coefficient corresponding to the parameter value. Subsequently, in step S413, the proxy development unit 132 applies an interpolation filter with fewer taps than in the material development to the RAW frame being processed so as to obtain an RGB image, and outputs the developed image thus obtained.

As described above, as the proxy development has fewer process steps than the material development as neither sharpness adjustment nor noise removal is performed unlike in the material development, the computation amount involved in interpolation is smaller in the proxy development. As a result, the processing time of proxy development can be shorter than that of material development. Additionally, in proxy development steps S411 to S413 may alternatively be performed after the RAW images are first resized to reduce the resolution of the RAW images. In this case, although an additional step of resizing is required, the overall processing time is shortened because of the reduced amount of data that has to be processed thereafter.

According to the foregoing embodiment, it is possible to prioritize outputting of proxy data when material data and proxy data are simultaneously output, so that the export of proxy data can be prioritized without further burdening the user.

Embodiment 2

In the example of Embodiment 1, the order of performing material development and proxy development is determined based on whether or not the export of proxy data is prioritized when material data and proxy data are simultaneously output. In Embodiment 2, a case is described in which tasks are added in different ways depending on whether or not the export of proxy data is prioritized. Note that components that perform operation/processing identical to those described with respect to Embodiment 1 are assigned identical reference signs and description thereof is omitted. Additionally, the configuration of the image processing apparatus 100 and the application according to this embodiment are identical to those shown in FIGS. 1A and 1B, and 2A to 2C, and thus the description thereof is omitted.

The operation of the image processing apparatus 100 according to this embodiment will be described hereinafter with reference to FIGS. 5A, 5B, and 6. FIG. 5A is a flowchart that shows an example of the processing of an export queue performed by the image processing apparatus 100 according to this embodiment. The following also describes a case in which processing that corresponds to the foregoing flowchart is performed, for example, by the CPU 101 executing programs stored in the ROM 102 and the HDD 104 to function as the control unit 120.

Initially, in step S501, the CPU 101 determines whether or not simultaneous output of the material data and proxy data from RAW moving images added to the export queue has been set. This processing is the same as that in step S301 of FIG. 3A. If it is determined that simultaneous output has been set, the CPU 101 advances the process to step S502. Conversely, if it is determined that simultaneous output has not been set, the CPU 101 advances the process to step S509.

In the subsequent step S502, the CPU 101 determines whether or not outputting of proxy data has been prioritized. This processing is the same as that in step S302. If it is determined that outputting of proxy data has been prioritized, the CPU 101 advances the process to step S503. Conversely, if it is determined that outputting of proxy data has not been prioritized, the CPU 101 advances the process to step S508.

In the subsequent step S503, the CPU 101 divides the outputting of material data and the outputting of proxy data into separate tasks. Next, in step S504, the CPU 101 determines whether or not a task that includes outputting of material data exists in the current export queue. If it is determined that such a task exists, the CPU 101 advances the process to step S505. Conversely, if it is determined that no such task exists, the CPU 101 advances the process to step S506.

In step S505, the CPU 101 sorts the tasks. Specifically, after adding the tasks to output proxy data to the end of the export queue, the CPU 101 sorts the tasks so that proxy data is output before all of the other tasks in the export queue including the outputting of material data are performed. This prioritizes the execution of the task to output proxy data over all of the tasks to output material data included in the export queue. The process then proceeds to step S507. In step S506, after the tasks of outputting proxy data are added to the end of the export queue, the CPU 101 advances the process to step S507. In step S507, the CPU 101 adds the tasks to output material data to the tail end of the export queue.

Next, if it is determined in step S502 that the outputting of proxy data has not been set as being prioritized, in step S508, the CPU 101 adds the outputting of material data and the outputting of proxy data to the end of the export queue as a single task. Meanwhile, if it is determined in step S501 that simultaneous outputting of material data and proxy data has not been set as being prioritized, in step S509, the CPU 101 adds one of the tasks, set in the export file setting section 282, to output material data and proxy data to the end of the export queue.

FIG. 5B is an example of an export queue window that shows a result of executing the flowchart shown in FIG. 5A. In this example, it is assumed that the RAW moving images "AAAA", "BBBB", and "CCCC" have been added to the export queue in this order. Regarding the export settings of the RAW moving images "AAAA" and "BBBB", it is further assumed that the material data box and the proxy data box in the export file setting section 282 are both checked and the box in the proxy data priority output setting section 285 is also checked. On the other hand, regarding the export settings of the RAW moving image "CCCC", it is further assumed that the material data box and the proxy data box in the export file setting section 282 are both checked and the box in the proxy data priority output setting section 285 is not checked.

In this case, as shown in FIG. 5B, the tasks to output the proxy data of the RAW moving images "AAAA" and "BBBB" are at the front of the queue so that the outputting of the proxy data can be completed before the outputting of the material data. As the outputting of proxy data is not prioritized in the export setting of the RAW moving image "CCCC", the sorting of tasks does not apply to this task even though this task involves outputting of proxy data.

Also, it has been described that, in the processing performed in step S505, the tasks are sorted so that a task to output the proxy data of different RAW moving images are set to be at the front of the queue. However, outputting of proxy data may be prioritized for each moving image. For example, the tasks may be executed in the order in which the RAW moving images are added to the export queue, so that data may be output in the order of proxy data from the RAW moving images "AAAA", material data from the RAW moving images "AAAA", proxy data from the RAW moving images "BBBB", and material data from the RAW moving images "BBBB".

Additionally, in FIG. 5B, the number of remaining clips and remaining time shown in the export progress indication section 262 are quantities that apply to both the outputting of the proxy data and the outputting of the material data. Alternatively, these quantities may be separately added up for the outputting of proxy data and the outputting of material data for display. Moreover, the group of tasks to output proxy data and the group of tasks to output material data may be indicated with different characters or background colors to allow visual distinction between the types of tasks.

The following describes an example of the export processing performed by the image processing apparatus 100 according to this embodiment of the invention. FIG. 6 is a flowchart that shows an example of the export processing according to Embodiment 2 of the invention. The following also describes a case in which processing that corresponds to the foregoing flowchart is performed, for example, by the CPU 101 executing the programs stored in the ROM 102 and the HDD 104 to function as the control unit 120 and the development processing unit 130.

First, in step S601, the CPU 101 retrieves the task at the front of the export queue. Next, in step S602, the CPU 101 determines whether or not the task retrieved in step S601 involves outputting of both material data and of proxy data. If it is determined that the task involves both, the CPU 101 advances the process to step S606. If it is determined that the task involves one of outputting of material data and outputting of proxy data, the CPU 101 advances the process to step S603.

As the processing from steps S603 to S605 is identical to that from steps S314 to S316 of Embodiment 1, the description thereof is omitted. Likewise, as the subsequent processing from steps S606 to S609 is also identical to that from steps S310 to S313 of Embodiment 1, the description thereof is omitted.

In step S610, the CPU 101 determines whether or not there are any unprocessed tasks in the export queue. If it is determined that an unprocessed task exists, the CPU 101 advances the process to step S601. Conversely, if it is determined that there are no unprocessed tasks, the CPU 101 terminates the processing. At this moment, the CPU 101 may notify the user that the outputting of all of the proxy data has been completed by playing back a predetermined sound or displaying a message to that effect. This allows the user to know when the outputting of all of the proxy data is complete.

According to the foregoing embodiment, it is also possible to prioritize outputting of proxy data when material data and proxy data are to be simultaneously output, so that the export of proxy data can be prioritized without further burdening the user.

Embodiment 3

A case has been described in connection with the foregoing Embodiment 2, in which it is determined whether or not outputting of proxy data has been prioritized, according to the setting in the proxy data priority output setting section 285. It should be noted that certain digital video cameras can record a moving image with a smaller file size (referred to as a "camera proxy moving image" hereinafter) than a RAW moving image that is being recorded at the same time. The foregoing camera proxy moving image may be one that is obtained, for example, by developing each frame of the RAW moving image and then compressing and encoding it according to a predetermined predicting coding scheme (for example, H.264 or H.265).

Using a camera proxy moving image as the data for editing can save time in generating proxy data from the RAW moving image. On the other hand, if no camera proxy moving image is recorded simultaneously with a RAW moving image, proxy data needs to be generated from the RAW moving image.

As such, in Embodiment 3, whether or not to prioritize outputting of proxy data is decided by determining whether or not a camera proxy moving image is recorded simultaneously with a RAW moving image. Note that components that perform operation/processing identical to those described with respect to Embodiment 1 or 2 are assigned identical reference numbers, and description thereof is omitted. Additionally, the configuration of the image processing apparatus 100 and the application according to this embodiment are identical to those shown in FIGS. 1A and 1B, and 2A to 2C, and thus the description thereof is omitted. In this embodiment, it is assumed that, when generating a RAW moving image, information indicating whether or not a camera proxy moving image was recorded simultaneously with a RAW moving image is stored in the file header of the RAW moving image.

Figure 7:
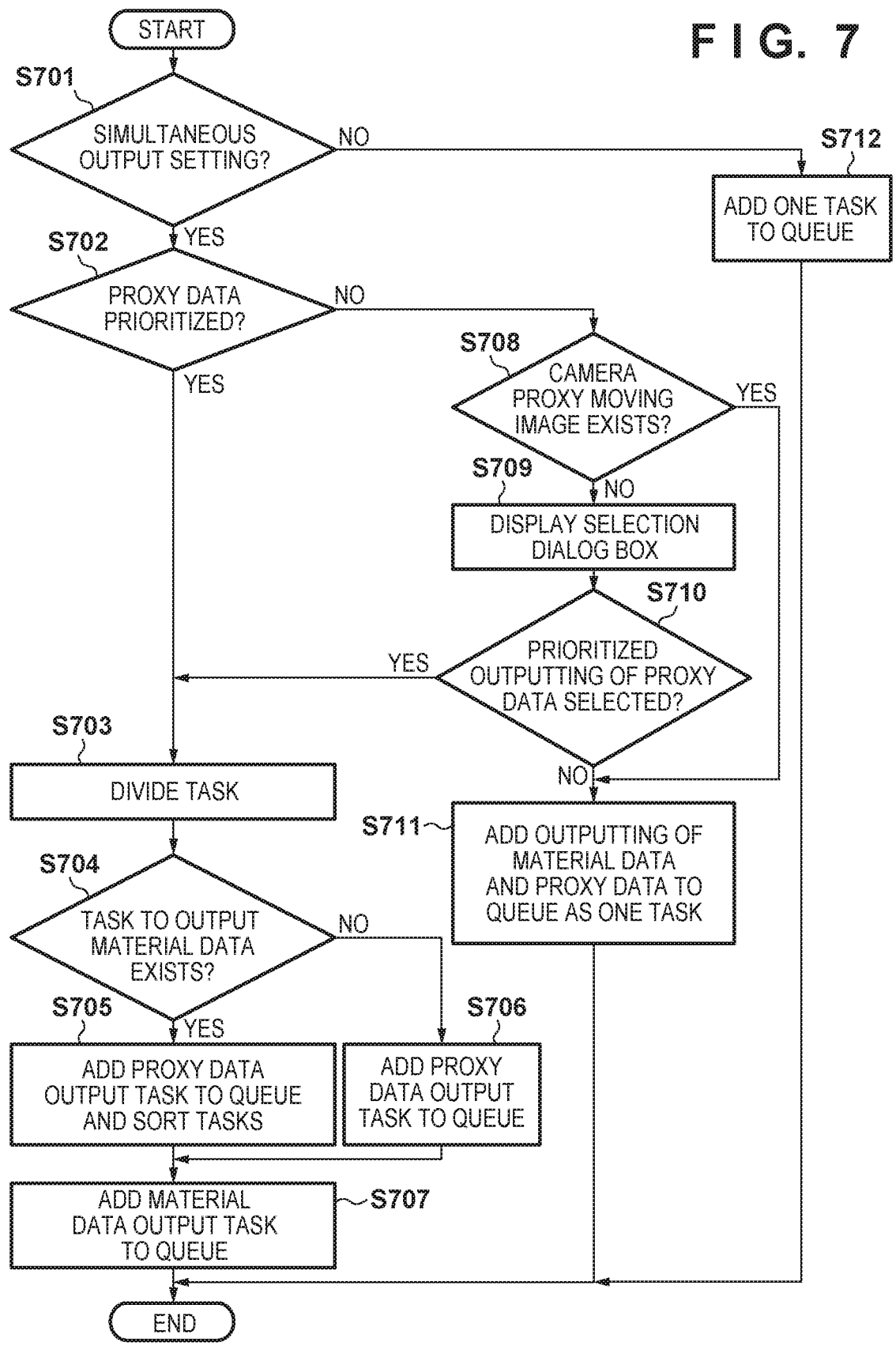
FIG. 7 is a flowchart that shows an example of the processing of an export queue performed by the image processing apparatus 100 according to a third embodiment of the invention.

The operation of the image processing apparatus 100 according to this embodiment will be described hereinafter with reference to FIG. 7. FIG. 7 is a flowchart that shows an example of the processing of an export queue performed by the image processing apparatus 100 according to this embodiment. The following also describes a case in which processing that corresponds to the foregoing flowchart is performed, for example, by the CPU 101 executing programs stored in the ROM 102 and the HDD 104 to function as the control unit 120.

As the processing from steps S701 to S707 is identical to that from steps S501 to S507 in FIG. 5A in Embodiment 2, the description thereof is omitted. Next, in step S708, the CPU 101 determines, based on the information stored in the header area of the RAW moving image to be exported, whether or not a camera proxy moving image has been recorded simultaneously with the RAW moving image. If it is determined that a camera proxy moving image has been recorded simultaneously, the CPU 101 advances the process to step S711. On the other hand, if it is determined that a camera proxy moving image has not been recorded simultaneously, the CPU 101 advances the process to step S709.

In the subsequent step S709, the CPU 101 controls the display control unit 109 to show, on the display 110, a dialog box asking the user whether or not to prioritize outputting of proxy data since a camera proxy moving image has not been recorded simultaneously with the RAW moving image. This dialog box can include a selection button to allow the user to set whether or not to prioritize outputting of proxy data.

Subsequently, in step S710, the CPU 101 determines whether or not prioritized outputting of proxy data was selected in the dialog shown in step S709. If it is determined that prioritized outputting of proxy data was selected, the CPU 101 advances the process to step S703. On the other hand, if it is determined that prioritized outputting of proxy data was not selected, the CPU 101 advances the process to step S711. As the processing from the subsequent steps S711 and S712 is identical to that from steps S508 and S509 of Embodiment 2, the description thereof is omitted.

According to the foregoing, even if the box in the proxy data priority output setting section 285 is not checked, outputting of proxy data can be prioritized.

Figure 6:
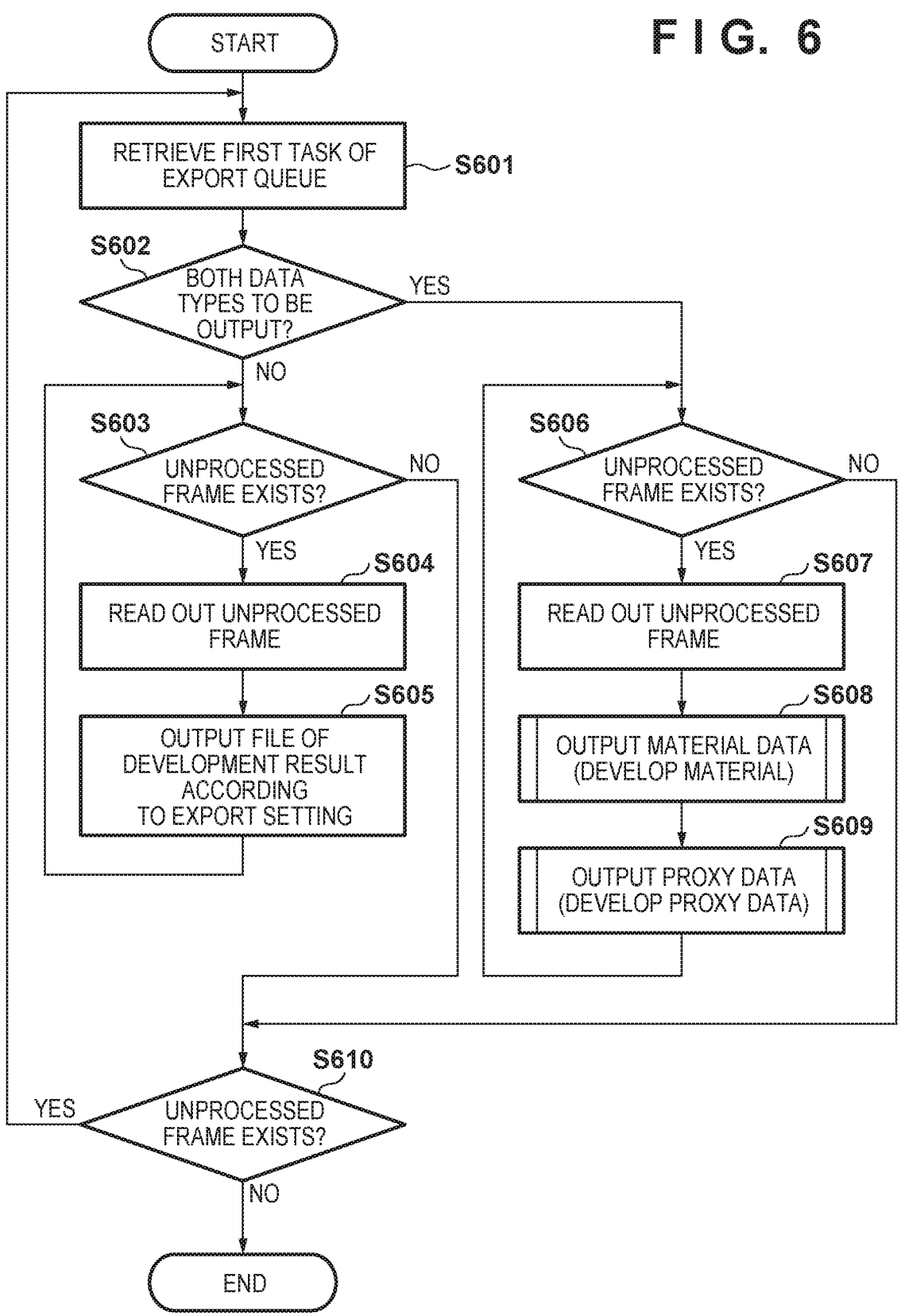
FIG. 6 is a flowchart that shows an example of the export processing performed by the image processing apparatus 100 according to the second embodiment.

Additionally, the export processing according to Embodiment 3 that is executed after a RAW moving image is added to the export queue is the same as that shown in the flowchart of FIG. 6 in Embodiment 2. Accordingly, description of this processing is omitted.

As described above, according to this embodiment, it is also possible to prioritize outputting of proxy data when material data and proxy data are to be simultaneously output, so that the export of proxy data can be prioritized without further burdening the user.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-211938, filed on Nov. 1, 2017, which is hereby incorporated by reference herein in its entirety.

What is claimed is:

1. An image processing apparatus comprising at least one processor which functions as:
   a first processing unit configured to execute first processing on frames of RAW moving images, the first processing including first development processing which generates material moving images;
   a second processing unit configured to execute second processing on frames of RAW moving images, the second processing including second development processing which generates proxy moving images;
   an output setting unit configured to set whether to output both of the material moving images and the proxy moving images;
   a control unit configured to perform control to generate, from RAW moving images to be processed, the material moving images and the proxy moving images by causing the first and second processing units to execute the first and second processing, respectively in a case where both of the material moving images and the proxy moving images are set to be outputted; and
   a priority setting unit configured to set whether to prioritize the proxy moving images over the material moving images in outputting in a case where both of the material moving images and the proxy moving images are set to be outputted,
   wherein the control unit executes the first and second processing on each frame of the RAW moving images to be processed to generate the material moving images and the proxy moving images in a case where both of the material moving images and the proxy moving images are set to be outputted and the proxy moving images are not set to be prioritized, and executes the first processing on all of the frames of the RAW moving images to be processed to generate the material moving images after executing the second processing on all of the frames of the RAW moving images to be processed to generate the proxy moving images, in a case where both of the material moving images and the proxy moving images are set to be outputted and the proxy moving images are set to be prioritized.

2. The image processing apparatus according to claim 1, wherein the at least one processor further functions as an acquisition unit configured to acquire the frames of the RAW moving images to be processed from a storage medium, wherein, in a case where the proxy moving images are not prioritized, the control unit performs control to execute the first and second processing on the frames of the RAW moving images to be processed that are acquired by the acquisition unit, and
   in a case where the proxy moving images are prioritized, the control unit performs control to cause the acquisition unit to acquire the frames of the RAW moving images to be processed when the second processing is executed and also when the first processing is executed.

3. The image processing apparatus according to claim 1, wherein, in a case where the RAW moving images to be processed are a plurality of different RAW moving images and the proxy moving images are prioritized,
   the control unit performs control to acquire a plurality of the material moving images by causing the first processing unit to execute the first processing on all of the frames of each of the plurality of different RAW moving images, after acquiring a plurality of the proxy moving images by causing the second processing unit to execute the second processing on all of the frames of each of the plurality of different RAW moving images.

4. The image processing apparatus according to claim 1, wherein, in a case where the RAW moving images to be processed are a plurality of different RAW moving images and the proxy moving images are prioritized,
   the control unit performs control to acquire, for each of the RAW moving images, a material moving image by causing the first processing unit to execute the first processing on all of the frames, after acquiring a proxy moving image by causing the second processing unit to execute the second processing on all of the frames.

5. The image processing apparatus according to claim 1, wherein the second development processing is a proxy development processing which is a more simplified processing than the first development processing, and
   the proxy moving images acquired through the second processing have a lower resolution than the material moving images acquired through the first processing.

6. The image processing apparatus according to claim 1, wherein the at least one processor also functions as,
   a selection unit configured to select the RAW moving images to be processed; and
   a registration unit configured to register a processing instruction to execute the processing corresponding to the setting set by the output setting unit on the RAW moving images to be processed that are selected by the selection unit,
   wherein the control unit performs control to execute the first processing or the second processing based on the processing instruction registered by the registration unit.

7. The image processing apparatus according to claim 6, wherein, in a case where both of the material moving images and the proxy moving images are set to be outputted and prioritization of the proxy moving images is not set, the registration unit registers execution of the first processing and execution of the second processing on the RAW moving images to be processed as a single processing instruction, and
   in a case where both of the material moving images and the proxy moving images are set to be outputted and prioritization of the proxy moving images is set, the registration unit registers execution of the first processing and execution of the second processing on the RAW moving images to be processed as separate processing instructions.

8. The image processing apparatus according to claim 7, wherein, in a case where execution of the first processing and execution of the second processing are specified in a single processing instruction, the control unit performs control to execute the first processing and the second processing on each frame of the RAW moving images to be processed to acquire the material moving images and the proxy moving images.

9. A method for controlling an image processing apparatus comprising at least one processor functions as:
 a first processing unit configured to execute first processing on frames of RAW moving images, the first processing including first development processing which generates material moving images;
 a second processing unit configured to execute second processing on frames of RAW moving images, the second processing including second development processing which generates proxy moving images;
 an output setting unit configured to set whether to output both of the material moving images and the proxy moving images;
 a control unit configured to perform control to generate, from RAW moving images to be processed, the material moving images and the proxy moving images by causing the first and second processing units to execute the first and second processing, respectively, in a case where both of the material moving images and the proxy moving images are set to be outputted; and
  a priority setting unit configured to set whether to prioritize the proxy moving images over the material moving images in outputting in a case where both of the material moving images and the proxy moving images are set to be outputted,
  the method comprising:
executing the first and second processing on each frame of the RAW moving images to be processed to generate the material moving images and the proxy moving images in a case where both of the material moving images and the proxy moving images are set to be outputted and the proxy moving images are not set to be prioritized and executing the first processing on all of the frames of the RAW moving images to be processed to generate the material moving images after executing the second processing on all of the frames of the RAW moving images to be processed to generate the proxy moving images, in a case where both of the material moving images and the proxy moving images are set to be outputted and the proxy moving images are set to be prioritized.

10. A non-transitory computer-readable storage medium storing a program that, when executed by a processor of an image processing apparatus comprising:
 a first processing unit configured to execute first processing on frames of RAW moving images, the first processing including first development processing which generates material moving images;
 a second processing unit configured to execute second processing on frames of RAW moving images, the second processing including second development processing which generates proxy moving images; and
 an output setting unit configured to set whether to output both of the material moving images and the proxy moving images,
 the image processing apparatus generating, from RAW moving images to be processed, the material moving images and the proxy moving images by causing the first and second processing units to execute the first and second processing, respectively, in a case where both of the material moving images and the proxy moving images are set to be outputted and the image processing apparatus further comprising priority setting unit configured to set whether to prioritize the proxy moving images over the material moving images in outputting in a case where both of the material moving images and the proxy moving images are set to be outputted, causes the processor to perform:
executing the first and second processing on each frame of the RAW moving images to be processed to generate the material moving images and the proxy moving images in a case where both of the material moving images and the proxy moving images are set to be outputted and the proxy moving images are not set to be prioritized, and executing the first processing on all of the frames of the RAW moving images to be processed to generate the material moving images after executing the second processing on all of the frames of the RAW moving images to be processed to generate the proxy moving images, in a case where both of the material moving images and the proxy moving images are set to be outputted and the proxy moving images are set to be prioritized.

* * * * *